April 19, 1960 L. A. WALL ET AL 2,933,536
INHIBITED PYROLYSIS OF FLUOROCARBON POLYMERS
Filed Feb. 28, 1957 2 Sheets-Sheet 1

INVENTORS
Leo A. Wall
John D. Michaelsen
Arthur Vinograd
BY
Leonard L. Stoll
ATTORNEY
AGENT United States Patent Office 2,933,536
Patented Apr. 19, 1960

2,933,536

INHIBITED PYROLYSIS OF FLUOROCARBON POLYMERS

Leo A. Wall, Washington, D.C., and John D. Michaelsen, Chevy Chase, Md., assignors to the United States of America as represented by the Secretary of Commerce Application February 28, 1957, Serial No. 643,207

3 Claims. (Cl. 260—653.1)

This invention is concerned with the thermal decomposition of fluorocarbon polymers and more particularly with a method of inhibiting the thermal degradation of high molecular weight fluorocarbon polymers including polytetrafluoroethylene and with the production of highly stable intermediate polymer compounds such as greases, waxes, and oils having any desired fluidity.

Polytetrafluoroethylene, hereafter referred to as Teflon, is the most thermally stable linear polymer known at the present time. However, in the general range of from 450–700° C. Teflon is subject to pyrolysis or thermal decomposition. Heretofore controlled pyrolysis of Teflon has been carried on in a vacuum or in the presence of an inert gas such as nitrogen. The results of such work indicates that Teflon and related fluorocarbon polymers undergo a rapid decomposition almost entirely to volatile monomer suggesting an unravelling of the polymer chain.

The present invention is based on the discovery that the initial degradation of fluorocarbon polymers can be slowed down; that is, inhibited, by conducting the pyrolysis in an atmosphere of certain gases. The particular gases used are those which tend to terminate the thermally broken polymer chains in such a way as to prevent the complete unraveling of the polymer to a monomer.

The advantages brought about by the present invention are three-fold. First, by maintaining fluorocarbon polymers in the atmosphere of certain gases thermal degradation of the ploymers can be inhibited so that the useful high-temperature limit of the particular polymer without substantial weight loss is increased. Second, by terminating the polymer breakdown short of volatile monomer products, intermediate products of various viscosities such as greases, waxes, and oils, can be obtained in large quantities with relatively little loss in weight from the weight of the original polymer. Recovery of polymerized intermediate products by the instant invention are as much as 98% by weight, of the original polymer.

Third, the intermediate products produced by pyrolysis are often saturated by elements from certain inhibiting gases; i.e., $Cl_2$, $F_2$ producing intermediate polymers that are relatively inert and hence more thermally stable than have heretofore been known.

The intermediate products are with other gases; i.e., $H_2$, toluene and hydrocarbons in general, unsaturated.

One object of the instant invention is to increase the upper useful temperature limit of fluorocarbon polymers.

Another object of the present invention is to inhibit the thermal degradation of fluorocarbon polymers at ordinary pyrolysis temperatures.

Still another object of the present invention is the production of substantial quantities of intermediate fluorocarbon polymer compounds such as greases, waxes, and oils having any desired viscosity.

A still further object of the present invention is the production of new intermediate fluorocarbon polymer compounds.

An additional object of the present invention is the provision of a means and method for inhibiting the complete unraveling of heavy fluorocarbon polymers undergoing thermal degradation at pyrolysis temperatures.

Another object of the present invention is the production of saturated intermediate fluorocarbon polymers.

An additional object of this invention is the production where desired of unsaturated intermediate fluorocarbon polymers.

Other uses and advantages of the invention will become apparent upon reference to the specification and drawings in which.

Figure 1:
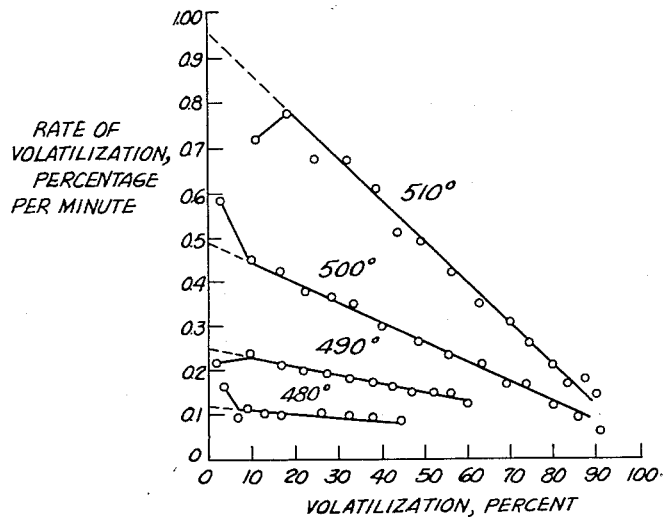
Fig. 1 is a plot of the rate of volatilization of Teflon in a vacuum as a function of percentage volatilization in the pyrolysis temperature range of 480–510° C.

In Fig. 1 is shown a plot of the rate of volatilization of Teflon in a vacuum at various pyrolysis temperatures in the range between 480 and 510° C. As can be seen from the plot, for temperatures above about 480° C. the initial rate of volatilization or the initial rate at which weight loss occurs is very high and gradually decreases as the percent of volatile product increases. Below 480° C. the rate of volatilization is fairly constant up to about 50% volatilization.

Below about 480° C. the rate curves shown in Fig. 1 all become relatively flat similar to the curve shown for 480° C. and it becomes necessary to plot the actual weight loss rather than the rate of weight loss to distinguish between curves for various temperatures and for reactions under different gas atmospheres.

Figure 2:
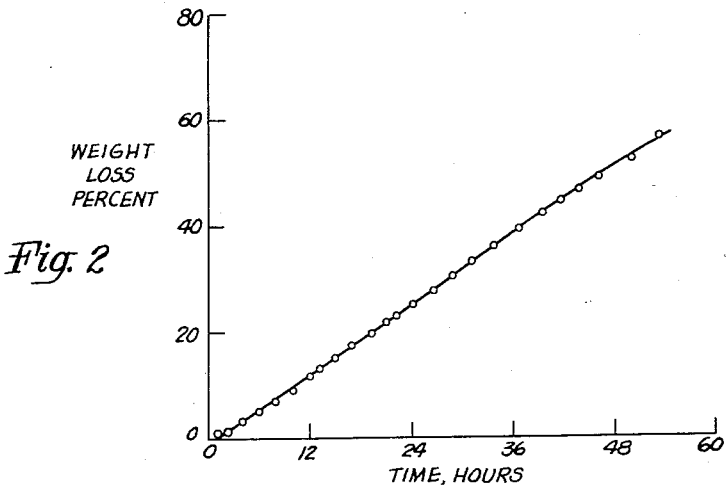
Fig. 2 is a pyrolysis plot of the weight loss of Teflon in an atmosphere of flowing nitrogen as a function of time at a temperature of 460° C.

In Fig. 2 is shown the percent weight loss of Teflon in an atmosphere of flowing nitrogen at a temperature of 460° C. The action under a neutral gas such as nitrogen is very close to the action in a vacuum and was used for comparison with other flowing gas atmospheres. As can be seen from Fig. 2 the initial weight loss is essentially zero and following a linear curve to about 40% volatilization.

During the degradation shown in Fig. 2 the polymer retains the initial rigid form to about 50% conversion, after which it softens. During this pyrolysis close to 100% of the volatile matter is a monomer.

The present invention is concerned with the discovery that the initial weight loss of Teflon at the lower pyrolysis temperatures can be greatly inhibited by a controlled pyrolysis in the atmosphere of certain gases.

These results are interpreted in terms of free-radical chain mechanisms which are applicable to the degradation of numerous polymers. In the case of Teflon the following mechanism appears applicable for its thermal decomposition in a vacuum or under nitrogen.

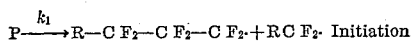

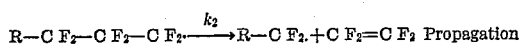

$$2R-C\ F_2 \xrightarrow{k_4} P\ or\ 2P\ \text{Termination} \qquad (1)$$

and/or

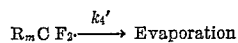

The P represents any size polymer, R is part of a polymer chain, the $k$'s are the specific rate constants, and $R_m$ is a chain of about 70 carbon atoms.

This picture of the degradation admits the possibility of inhibiting the weight loss of the polymer by increasing the probability of the first termination step with relation to the propagation (or depolymerization) step.

It is possible to inhibit the degradation of the polymer to some extent by a termination reaction in which a molecule or an atom from the gas atmosphere combines with the polymer radical. However, along with this inhibition is a catlaytic effect, presumably caused by the reaction of an atom with the polymer chain to give a new polymer radical. This catalytic effect also causes a drop in molecular weight. Specifically then, the applicable additional steps for the mechanism of this inhibition with hydrogen for example are:

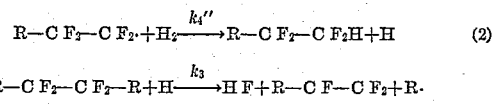

The above reaction produces an unsaturated intermediate polymer having the general formula R—CF=CF$_2$ as indicated.

Similar steps for inhibiting with fluorine are:

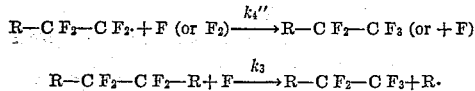

The fluorine reaction as distinguished from the hydrogen reaction given previously results in a saturated intermediate of the general formula R—CF$_2$—CF$_3$. The effect of the $k_3$ step is to counteract the inhibition produced by the $k_4''$ step. The net result is a conversion of the unraveling mechanism to a random one which initially has a very slow rate of volatilization but in subsequent stages becomes faster than the rate under vacuum. As the temperature is raised, the length of the inhibition period becomes less and less, until at 480° or higher the overall effect is catalytic.

From this mechanism it is to be expected that the best inhibition is one which can form a very strong bond in the inhibition reaction while a weak bond is formed in the catalytic reaction. In other words, if the inhibiting gas is AB, a strong C—A bond is desired giving a very stable B radical so that BF is labile.

The polymer used was in the form of a water suspension of polytetrafluoroethylene obtained from E. I. du Pont de Nemours and Company, Incorporated, designated by them as TD–3, as described in the NBS Journal of Research, vol. 57, No. 4 of October 1956, pages 185–204. The suspension was frozen and then dried in vacuo while frozen, and the powder so obtained was used in the experiments.

The Freons were all from E. I. du Pont de Nemours and Company, Inc. while the bromine, chloroform, cumene, pyridine, aniline, nitrobenzene, and benzaldehyde were obtained from Fisher Scientific Company in the purest grades available. The NO, Cl$_2$, ClF$_3$, and H$_2$ were the purest obtainable from Mathieson Company, Incorporated. The IF$_5$ was obtained from the General Chemical Company as research grade.

The CF$_3$I was prepared in our laboratory by the decomposition of perfluoro silver acetate in the presence of I$_2$ and purification by distillation (B.P. −22° C.).

The rate of degradation was measured by determining the weight loss of the polymer after periodic heating under the various flowing gases. The sample of polymer was usually about 1 gram in size and was placed in a porcelain boat for heating for all but the corrosive gases ClF$_3$ and IF$_5$. For these two gases the samples were heated in a nickel boat, which was found not to corrode during the course of the experiment.

The porcelain boats were heated in a Pyrex tube surrounded with a brass furnace. The temperature was determined by a thermocouple placed in the tube so as to center in the space above the porcelain boat. The temperature was regulated with a hand-operated powerstat to ±1° C.

Because of the very corrosive nature of fluorine and the fluorine-halogen compounds, especially at the temperatures of pyrolysis, it was found by experience that a tube of nickel was needed to contain the reaction. For this purpose a special nickel tube was obtained, and its ends were machined so as to fit a 29/42 standard taper joint. The rest of the apparatus leading to the tube and away from the tube was made of glass. It was attached to the nickel tube by means of two water-cooled joints. Although the glass would corrode during the experiments, this corrosion was slow compared with the overall duration of all the experiments.

A brass furnace placed around the nickel tube was used to bring the tube to the desired temperature. The temperature was measured in the space between the furnace and the nickel tube by an iron-constantan thermocouple. The ends of this space were plugged with asbestos paper.

A typical measurement was made by first placing the boat containing a weighed sample of the polymer in the unheated portion of the tube. The system was then thoroughly flushed with the gas or vapor under study, and a steady flow was maintained. The temperature of the furnace was brought up to or maintained at the desired level. The boat was pushed into the furnace. The manually operated variable transformer sometimes had to be readjusted in order to maintain the desired temperature. Temperature equilibrium was usually reached about 3 to 4 minutes after the introduction of the boat into the furnace. The time at which the temperature first reached the desired level was taken as the zero time for that particular run. At the end of a given interval of time, usually one hour, the boat was withdrawn from the furnace into the unheated part of the tube. This time was taken at the end of the interval of pyrolysis. Experience showed that it made no difference to the results whether the boat was withdrawn from the tube and allowed to cool to room temperature in the air or left to cool in the tube.

When pyrolyzed in a vacuum or under nitrogen, polytetrafluoroethylene was found to retain its original form. In many of the runs under inhibiting gases the polymer became very fluid at the temperature of pyrolysis. Although the molecular weight of the polymer could not be determined quantitatively, this change in viscosity from a solid to what is often a very fluid liquid was taken as indication of a very pronounced drop in molecular weight during the course of pyrolysis under the gases.

The materials with boiling points above room temperature were usually introduced by passing nitrogen as a carrier through the liquid at room temperature and passing the N$_2$ saturated with the vapor into the system. Water, however, was boiled directly into the flow system in which case the vapor pressure was near atmospheric.

Many gases were studied and are shown in the table as falling into three general groups; i.e., those producing inhibitory effects, those producing catalytic effects, and those exhibiting no effects.

The present invention is primarily directed to the gases in the first group as providing means for inhibiting weight loss. However, some of the catalytic gases of the second group are useful in producing intermediate polymer products when the attendant rapid increase in weight loss due to the catalytic effect of the gas can be tolerated.

The intermediate products produced by the hydrogen containing gases are generally unsaturated whereas the remaining active gases in general produce saturated products.

Table

| Inhibitory | Catalytic | No effect |
|---|---|---|
| $F_2$ | $H_2S$ | $N_2$ |
| $IF_5$ | $H_2O$ | $C_6H_5CF_3$ |
| $ClF_3$ | $O_2$ | $Br_2$ |
| $H_2$ | $SO_2$ | $CCl_3H$ |
| $Cl_2$ | $NO$ | $C_6H_5NH_2$ |
| $Cl_2$ and NO (10:1) | $H_2$ and NO (3:1) | $CCl_2F_2$ |
| $CCl_4$ | $NH_3$ | $CF_3I$ |
| $CCl_2F_2H$ | Pyridene | $CF_3H$ |
| $C_6H_5CH_3$ | | $Cl_2$ and NO (1:1) |
| $C_6H_5NO_2$ | | |
| $C_6H_5CHO$ | | |

Figure 3:
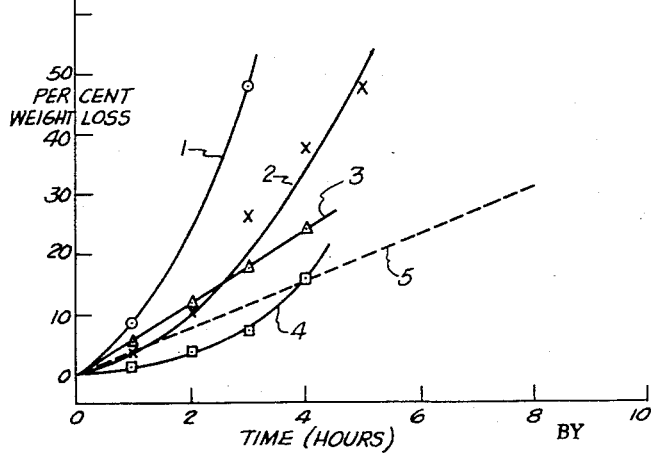
Fig. 3 is a plot of the pyrolysis of Teflon in the presence of hydrogen-containing gases at a pressure of one atmosphere.
Figure 4:
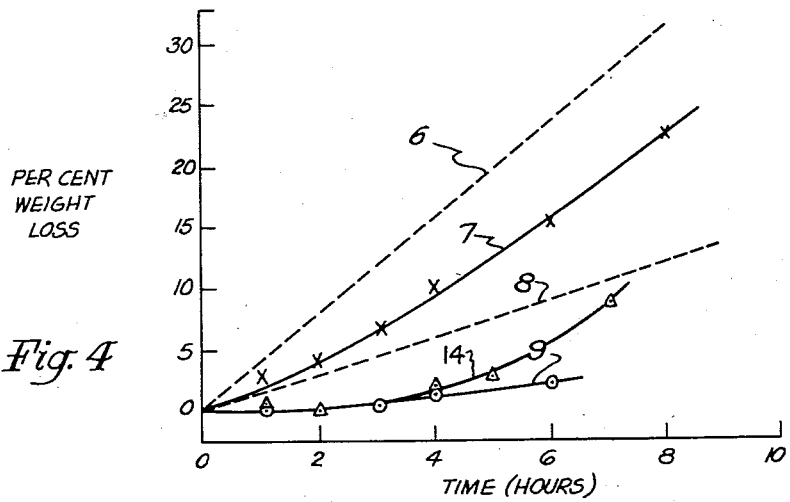
Fig. 4 is a similar plot of the pyrolysis of Teflon in the presence of halogen gases.
Figure 5:
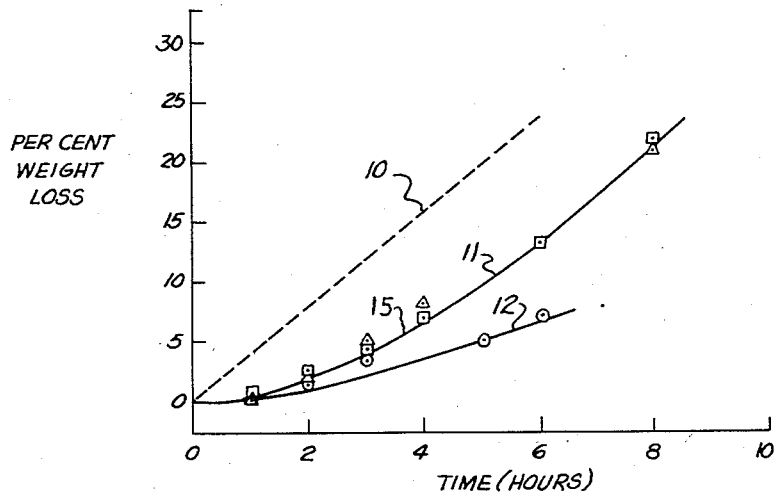
Fig. 5 is a similar plot of the Teflon in the presence of miscellaneous additional gases.

Since it was found that the rate under $N_2$ (e.g. 0.017% per minute at 457° C., is quite close to those observed previously under vacuum (e.g. 0.017% per minute at 453° C.), the results under $N_2$ were used as blank runs for comparison purposes in Figs. 3–5.

Fig. 3 shows a pyrolysis curve for hydrogen-containing gases as compared with the control gas nitrogen. The curves all represent pyrolysis at a temperature of 470° C. and a pressure of approximately one atmosphere. The nitrogen is represented by a dotted line 5 and is practically linear as indicated in Fig. 2 for a slightly different temperature.

Curve 1 is for ammonia and shows a catalytic effect with a rapid rise in percent weight loss from the beginning of the pyrolysis. The curve labeled 2 is for a hydrogen and nitric oxide mixture having a three-to-one mole ratio. This curve likewise shows a rapid increase in weight loss indicating a catalytic effect. Water vapor shown at 3 likewise increases the percentage weight loss over the neutral nitrogen and is catalytic.

The curve for hydrogen is indicated at 4. As can be seen the weight loss under hydrogen is reduced for an initial period of about four hours. This represents an initial inhibition of the pyrolysis. While the initial weight loss as shown is substantially reduced, the onset of the liquid state under the inhibiting gases is generally more rapid than with the neutral atmospheres. The result is that the polymer may be heated for an arbitrary length of time under hydrogen to produce the desired viscosity without substantial weight loss. For example, the weight loss after two hours at a temperature of 470° C., as shown in Fig. 3, is in the order of only a few percent.

Fig. 4 shows similar curves for some of the halogen gases. The dotted line labeled 6, represents nitrogen at 470° C. and the dotted line labeled 8 is nitrogen at 460° C. Curve 7 showing chlorine at 470° C. indicates the inhibiting action of that gas with respect to the nitrogen curve 6 at the same temperature.

Curve 14 showing chlorine trifluoride, also at 470° C. shows the disproportionately superior inhibiting action of the fluoride gas. A comparison of the $ClF_3$ curve 14 with the chlorine curve 7 indicates that while chlorine does in fact inhibit decomposition, the $F_2$ producing gas $ClF_3$ has a much more pronounced effect in initially retarding pyrolysis weight loss.

Curve 9 illustrates the inhibiting action of the second $F_2$ producing gas, iodine pentafluoride, at 460° C. As can be seen the weight loss for Teflon under $IF_5$ after as much as four hours at a temperature of 460° C. is almost negligible and even after six hours is in the order of only a few percent.

Fig. 5 shows pyrolysis curves for additional gases at 470° C. Curve 11 again shows the inhibiting action of chlorine with respect to the nitrogen control represented by dashed line 10.

Curve 15 represents a combination of chlorine and nitric oxide in a ten-to-one mole ratio. This curve coincides with the chlorine curve 11, indicating similar characteristics for the gas combination.

At 12 is shown the pyrolysis curve for nitrobenzene, indicating an inhibition much more pronounced than chlorine but a good deal less effective than the fluorine-producing gases $ClF_3$ and $IF_5$ shown in Fig. 4.

The best inhibitors, as can be seen from Figs. 3–5, were those which decomposed to give $F_2$, e.g. $ClF_3$ and $IF_5$. Their effects when compared with those of $Cl_2$ and $N_2$ are shown in Fig. 4. When in contact with the fluorine-containing gases the polymer liquified, and the rate of weight loss approached or surpassed that caused by $N_2$ after 5 to 7 hours at the indicated temperatures. Although a 1:1 mixture of $Cl_2$ and NO gave but little effect, a 10:1 mixture had about the same effect as $Cl_2$ alone, as shown in Fig. 5.

The polymerization inhibitor, nitrobenzene in Fig. 5 was found to be surprisingly good despite its low vapor pressure.

The present invention provides an inhibitor for the thermal decomposition of the polymer which is effective below 480° C. and yet does not allow the production of copious quantities of monomer or product of substantially similar volatility of the polymer. In other words, the result is a reaction whereby fluorocarbon radicals are terminated without the production of a radical which is too reactive.

It will be apparent that the embodiments shown are only exemplary and that various modifications can be made within the scope of invention as defined in the appended claims.

What is claimed is:

1. The method of converting normally solid polytetrafluoroethylene to an intermediate polytetrafluoroethylene of desired viscosity less than that of the solid without substantial loss in weight by inhibiting the pyrolysis of said solid polytetrafluoroethylene comprising heating said polytetrafluoroethylene in an atmosphere consisting of a gas selected from the group consisting of $IF_5$ and $ClF_3$ at a temperature range of from 450° to 480° C.

2. The method as defined in claim 1 in which said gas is $IF_5$.

3. The method as defined in claim 1 in which said gas is $ClF_3$.

References Cited in the file of this patent

UNITED STATES PATENTS

| | | |
|---|---|---|
| 2,392,389 | Joyce | Jan. 8, 1946 |
| 2,394,581 | Benning et al. | Feb. 12, 1946 |
| 2,664,449 | Miller | Dec. 29, 1953 |

OTHER REFERENCES

Banks et al.: J. Chem. Soc., 1948, part III, pp. 2188–2190 (1948).

Wall et al.: Journal of Research of the National Bureau of Standards, 56 (No. 1), January 1956.